United States Patent
Sawyer

(10) Patent No.: US 6,433,777 B1
(45) Date of Patent: Aug. 13, 2002

(54) APPARATUS FOR EXTENDING A CURSOR CONTROL STICK

(75) Inventor: Michael D. Sawyer, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/408,995

(22) Filed: Sep. 29, 1999

(51) Int. Cl.⁷ .............................. G09G 5/08; G09G 5/00; H05K 5/00
(52) U.S. Cl. ..................... 345/161; 345/168; 361/680
(58) Field of Search ................... 345/156, 157, 345/160, 161, 168, 169, 184; 74/471 XY; 361/680

(56) References Cited

U.S. PATENT DOCUMENTS

| | | | | |
|---|---|---|---|---|
| 4,395,134 A | * | 7/1983 | Luce ............................. | 368/3 |
| 4,575,591 A | | 3/1986 | Lugaresi ..................... | 200/6 A |
| 4,962,717 A | * | 10/1990 | Tsumiyama ............. | 114/144 R |
| 5,407,285 A | | 4/1995 | Franz .......................... | 400/490 |
| 5,488,206 A | | 1/1996 | Wu ............................. | 200/6 A |
| 5,521,596 A | | 5/1996 | Selker et al. ................. | 341/22 |
| 5,541,622 A | | 7/1996 | Engle et al. ................ | 345/161 |
| 5,594,618 A | | 1/1997 | Sellers ....................... | 361/680 |
| 5,615,083 A | | 3/1997 | Burnett ....................... | 361/686 |
| 5,621,610 A | * | 4/1997 | Moore et al. ............... | 361/680 |
| 5,622,446 A | | 4/1997 | Hibberd ..................... | 403/377 |
| 5,640,179 A | | 6/1997 | Lake .......................... | 345/161 |
| 5,663,747 A | * | 9/1997 | Shulman .................... | 345/161 |
| 5,667,325 A | | 9/1997 | Millard et al. ............. | 403/119 |
| 5,701,142 A | | 12/1997 | Brown et al. ............... | 345/168 |
| 5,708,562 A | * | 1/1998 | Agata et al. ................ | 361/683 |
| 5,712,660 A | | 1/1998 | Martin ....................... | 345/161 |
| 5,786,806 A | * | 7/1998 | Fester ........................ | 345/161 |
| 5,793,355 A | | 8/1998 | Youens ....................... | 345/157 |
| 5,797,696 A | | 8/1998 | Baynes et al. ............. | 403/377 |
| 5,803,643 A | | 9/1998 | Patelli et al. .............. | 403/109 |
| 5,982,356 A | * | 11/1999 | Akiyama .................... | 345/161 |

OTHER PUBLICATIONS

IBM Technical Disclosure Bulletin; "Telescopic Joystick"; Apr. 1, 1989; pp. 288–289.*

* cited by examiner

Primary Examiner—Bipin Shalwala
Assistant Examiner—Jeff Piziali
(74) Attorney, Agent, or Firm—Kevin E. West; Mark S. Walker; Suiter & Associates

(57) ABSTRACT

Apparatus are disclosed for extending cursor control sticks commonly utilized by portable computers to provide a joystick. The apparatus allow adjustment of joystick height, and provide for storage and use of the cursor control stick cap while attached to the mounting post.

34 Claims, 6 Drawing Sheets

APPARATUS FOR EXTENDING A CURSOR CONTROL STICK

FIELD OF THE INVENTION

The present invention relates generally to computers employing cursor control sticks, and more specifically to apparatus for extending a cursor control stick to provide a joystick.

BACKGROUND OF THE INVENTION

Computers, particularly portable computers such as laptop or notebook computers often comprise cursor control sticks that allow users to manipulate the location of a cursor or pointer on the computer's display. Such cursor control sticks, which are more commonly known by trade names such as Panastick, Glidestick, or EZ Point®, typically include a mounting post positioned among the keys of the computer's keyboard in a position conveniently reached by the user while typing (e.g., between the "G", "H", and "B" keys of the keyboard). A small rubberized cap is positioned on the neck of the mounting post. This cursor control stick cap may have a roughened surface so that the cursor control stick may be more easily manipulated by the user's fingertip. Miniature force sensing devices such as strain gauges or pressure sensitive resistive material sense lateral motion of the mounting post. This motion is then translated into a corresponding movement of the cursor on the computer's display.

Many cursor control sticks also allow a user to select a point on the computer display by applying a downward force on the cursor control stick cap. An example of such a cursor control stick is disclosed in U.S. Pat. No. 5,712,660 to Martin. Such cursor control sticks typically utilize multiple piece mounting posts and force sensing devices to sense both lateral and downward motion of the mounting post.

Because it is desirable that the lid portions of portable computers be folded against their keyboards for storage and transport, the cursor control sticks utilized by such computers can not extend substantially above their keyboards. Thus, the sides of the cursor control stick grip cannot be easily grasped by a user. Instead, friction between the user's fingertip and the top surface of the grip is relied upon for imparting lateral motion to the cursor control stick. While this configuration is sufficient for most cursor control operations, certain specialized applications, in particular computer gaming applications, require rapid movement of indicia throughout the two-dimensional plane of the computer's display. Similarly, many users desire finer control of the cursor than can be provided by a conventional cursor control stick. For such applications or users, the quicker, more precise control provided by a joystick, which may be grasped by its sides, would be advantageous. However, joystick controllers are not easily implemented in portable computers, and have, in the past, been provided as external peripheral components operably coupled to the portable computer via a cable.

Consequently, there exists a need for apparatus capable of extending the conventional cursor control stick commonly utilized by portable computers to provide a joystick. Such apparatus should allow adjustment of joystick height, and provide for storage and use of the cursor control stick cap during joystick use.

SUMMARY OF THE INVENTION

Accordingly, the present invention is directed to novel apparatus for extending a cursor control stick to provide a joystick for a portable computer such as a notebook or laptop computer.

In accordance with a first aspect of the present invention, a joystick extension for a cursor control stick is disclosed. When assembled the joystick extension extends the cursor control stick converting it into a joystick. The joystick extension is comprised of an extension member having a mounting post attachment portion disposed in a first or lower end and a grip attachment portion disposed in a second or upper end. The mounting post attachment portion attaches the extension member to the mounting post of the cursor control stick. The grip attachment portion provides attachment of a grip such as the cursor control stick cap. The grip attachment portion may also emulate the mounting post of the cursor control stick to provide attachment of a second extension member. In this manner, a plurality of extension members may be attached end to end to provide a longer joystick with greater leverage. Adjustment of joystick height may be accomplished by varying the number of extension members utilized.

In accordance with a second aspect of the present invention, a telescoping joystick extension for a cursor control stick is disclosed. The telescoping joystick extension is comprised of a telescoping extension member including one or more segments that may be alternately extended to provide a joystick controller device and retracted to provide a conventional cursor control stick. The telescoping extension member includes a mounting post attachment portion providing attachment of the telescoping extension member to the mounting post and a grip attachment portion for attachment of a grip.

In exemplary embodiments of the invention, the cursor control stick grip or cap may be used as the grip of the joystick extension. In this manner, the present invention provides for storage and use of the cap while the extension member is attached to the mounting post.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous objects and advantages of the present invention may be better understood by those skilled in the art by reference to the accompanying figures in which:

FIG. 1A is an isometric view of a portable computer employing a joystick extension for a cursor control stick in accordance with a first exemplary embodiment of the present invention;

DETAILED DESCRIPTION OF THE INVENTION

Figure 1B:
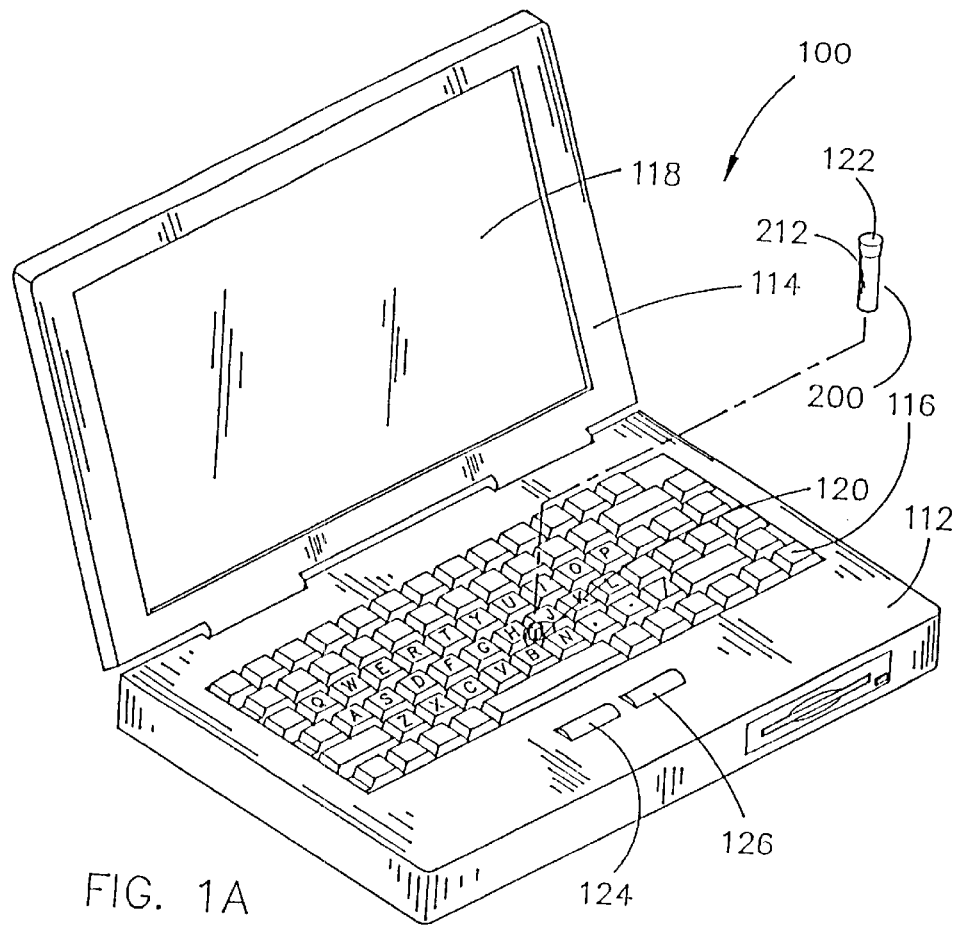
FIG. 1B is a side elevational view of the joystick extension shown in FIG. 1A.
Figure 1B:
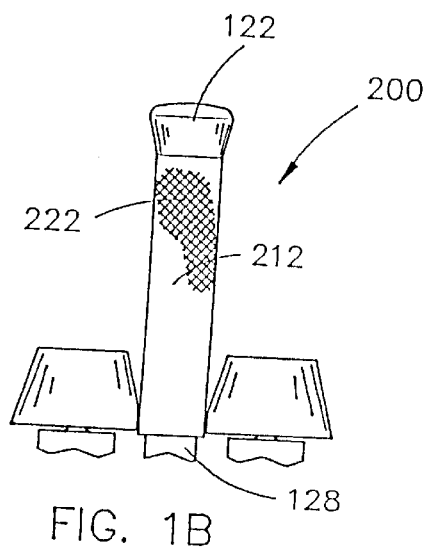

The present invention is directed to a joystick extension for cursor control sticks commonly utilized by portable computers such as laptop or notebook computers. The present invention thus provides portable computer users with an easy-to-use joystick for precise cursor control and/or gaming applications which does not require the use of any of the portable computer's external device ports, and which does not take up any more keyboard space than present cursor control sticks. Further, the joystick extension of the present invention allows for adjustment of joystick height, and provides for storage and use of the cursor control stick cap during joystick use. Accordingly, reference will now be made in detail to the presently preferred embodiments of the invention, examples of which are illustrated in the accompanying drawings.

Referring generally to FIGS. 1A through 5, a portable computer 100 in accordance with the present invention is described. Portable computer 100 is comprised of a processor portion 112 having a keyboard 116, and a lid portion 114 including a display 118. The lid portion 114 is pivotally hinged to the processor portion 112 so that the lid portion 114 and processor portion 112 may be folded together for storage and transport of the computer 100. Wherein the lid portion 114 and processor portion 112 are folded together, display 118 is held in an orientation generally adjacent and parallel to keyboard 116. This orientation helps to protect the display 118, typically a liquid crystal display (LCD), from damage while the computer 100 is being transported or stored.

In FIGS. 1A, 2A, 3A, and 4A, a cursor control stick 120 is shown positioned among the keys of keyboard 116 so that it may be conveniently manipulated by a user of the portable computer 100. Controls, such as buttons 124 & 126 positioned adjacent to the keyboard 116, emulate the buttons of a conventional computer mouse to provide user input for software employing a graphical user interface (GUI). In this manner, the cursor control stick 120 and buttons 124 & 126 may be used to accomplish such actions as "pressing" or "clicking" on-screen "buttons" in dialog boxes, choosing menu items, or the like.

Cursor control stick 120 is comprised of a mounting post 128 extending upwardly through an opening formed between keys of keyboard 116. A small grip or cap 122 is mounted to mounting post 128. This cap 122 is usually fabricated of rubber or a rubberized material, and may have a textured surface so that it does not slip against the user's fingertip when the cursor control stick 120 is manipulated by the user. Preferably, the cursor control stick cap 122 may be removed from mounting post 128 so that it may be replaced when damaged or worn.

Miniature force sensing apparatus such as strain gauges or pressure sensitive resistive material (not shown) sense lateral motion imparted to mounting post 128 as the cursor control stick 120 is manipulated by a user. This motion is translated into a corresponding movement of the cursor on display 118. In an exemplary embodiment, the cursor control stick 120 may also allow the user to select a point on the display 118 by applying a downward force on cursor control stick cap 122. An example of such a cursor control stick is described in U.S. Pat. No. 5,712,660, which is herein incorporated by reference in its entirety.

In FIGS. 1A, 2A, 3A, and 4A, cursor control stick 120 is shown positioned between the "G", "H", and "B" keys of keyboard 116. This location, which is near the home typing row, is advantageous because it allows a user to conveniently manipulate the cursor control stick 120 using the index finger of either hand from a normal typing position. However, it should be appreciated that while the location of cursor control stick 120 shown herein is preferred and is typical of the art, the cursor control stick 120 may alternately be positioned elsewhere within keyboard 116, or mounted to the processor portion 112 or lid portion 114 of portable computer 100 without departing from the scope and spirit of the present invention.

Referring now to FIGS. 1A through 2C, a joystick extension 200 in accordance with a first exemplary embodiment of the present invention is illustrated. As shown in FIGS. 1A, 1B, and 1C, the joystick extension 200 is comprised of an extension member 212 which may be attached to the mounting post 128 of cursor control stick 120. Preferably, extension member 212 has an elongate, cylindrical shape, and is fabricated from a rigid material such as a hard plastic, a metal, or a composite. A textured gripping surface 222 may be formed (e.g., cut, stamped, knurled, etc.) in the surface of extension member 212. Alternately, a textured gripping surface 222 may be provided which is comprised of a resilient material co-molded or otherwise adhered to the surface of the extension member 212 (not shown).

Figure 1C:
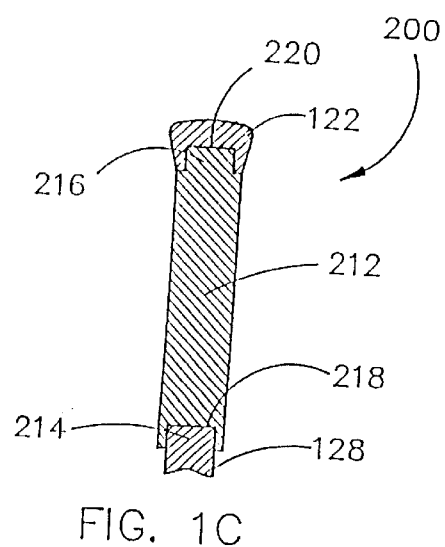
FIG. 1C is a cross-sectional side elevational view of the cursor control stick shown in FIG. 1A.
Figure 2A:
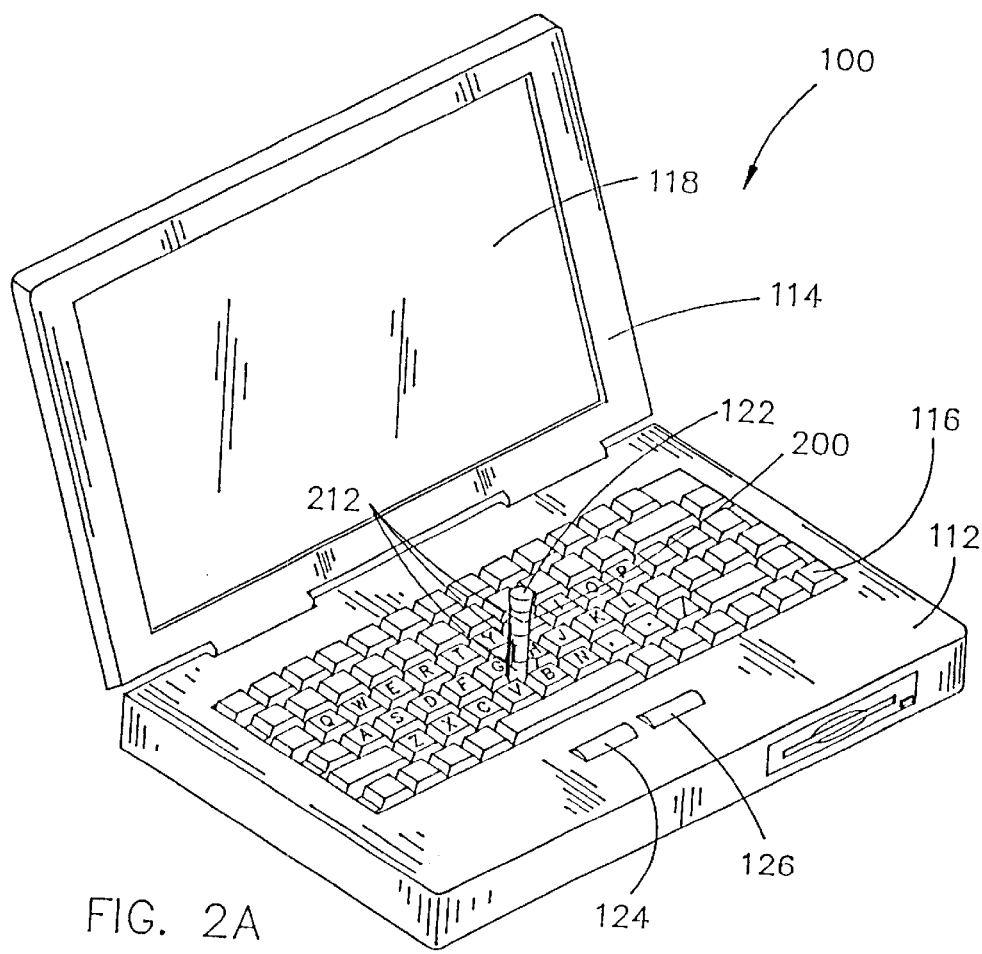
FIG. 2A is an isometric view of a portable computer employing a joystick extension having multiple extension members in accordance with a second exemplary embodiment of the present invention.
Figure 2B:
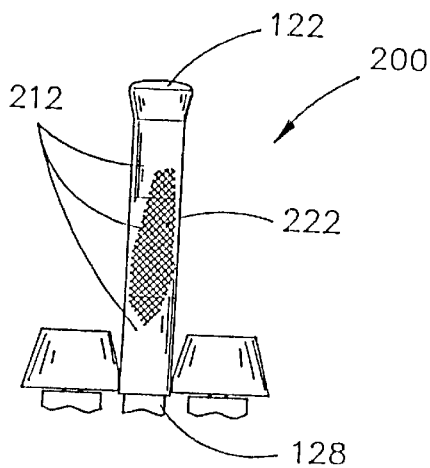
FIG. 2B is a side elevational view of the joystick extension shown in FIG. 2A.
Figure 2C:
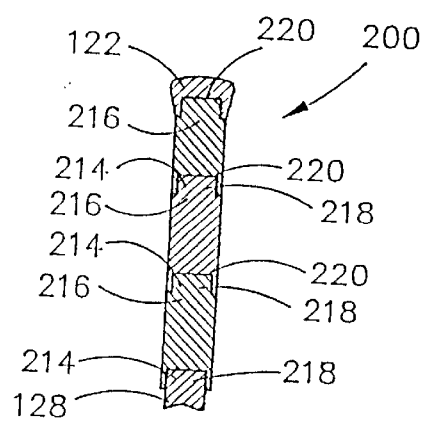
FIG. 2C is a cross-sectional side elevational view of the joystick extension shown in FIG. 2A.

As shown in FIGS. 1C and 2C, the base of extension member 212 includes a mounting post attachment portion 214 for securing the joystick extension 200 to cursor control stick 120. Preferably, the mounting post attachment portion 214 includes an aperture 218 sized and shaped to fit securely onto mounting post 128. For example, the mounting posts of conventional cursor control sticks often have a polygonal (e.g., square, triangular, pentagonal, hexagonal, etc.) shape to prevent rotation of the cursor control stick cap 122 during use. Thus, wherein the extension member 212 is mounted to such a cursor control stick, aperture 218 would have the same polygonal shape as the mounting post and would be sized to fit tightly thereon. Further, aperture 218 may be lined with a rubberized material or textured (not shown) to provide a more secure attachment to mounting post 128.

A grip attachment portion 216 is disposed at the upper end of the extension member 212 for the attachment of a grip. In the preferred embodiment shown, the grip attachment portion 216 includes a neck 220 which is identical in size and shape to mounting post 128 (e.g., polygonal) so that the cap 122 of cursor control stick 120 may be utilized as the grip. This configuration provides many advantages. First, the cursor control stick cap 122 provides a textured gripping surface at the end of joystick extension 200. Further, grip attachment portion 216 provides a natural storage/usage position for the cursor control stick cap 122 while joystick extension 200 is being utilized. Finally, should the joystick extension 200 be inadvertently left mounted to the cursor control stick 120 when the lid portion 114 is closed, cursor control stick cap 122, being made of a soft rubberized material, would minimize damage to the computer's display 118.

Alternatively, a specialized grip may be provided (not shown). Such a grip may be shaped and sized to fulfill the unique needs of a user. For example, a joystick extension 200 having an enlarged, ergonomically shaped grip may be provided for a disabled or arthritic user whose hands lack the dexterity to manipulate a conventional cursor control stick.

As shown in FIGS. 1A, 1B and 1C, joystick extension 200 may be comprised of a single extension member 212. Alternately, as shown in FIGS. 2A, 2B and 2C, two or more extension members 212 may be stacked together to provide a taller joystick extension 200 having greater leverage. It will be appreciated that the number of extension members 212 stacked on top of each other may be varied so that joystick height may be incrementally adjusted.

A user, to install and use the joystick extension 200, first removes the cursor control stick cap 122 from mounting post 128. One or more extension members 212 are then placed (stacked) onto the cursor control stick 120 by inserting mounting post 128 (or neck 220) into the aperture 218 of mounting post attachment portion 214 of each extension member 212. If the cursor control stick cap 122 is to be utilized as the joystick grip, it is then placed onto the grip attachment portion 216 of the uppermost extension member 212. To remove the joystick extension 200, the user only has to remove cursor control stick cap 122 from the joystick extension 200, remove the extension member(s) 212 from mounting post 128, and remount the cap 122 onto mounting post 128. The extension member(s) 212 may then be stored for later use.

Figure 3A:
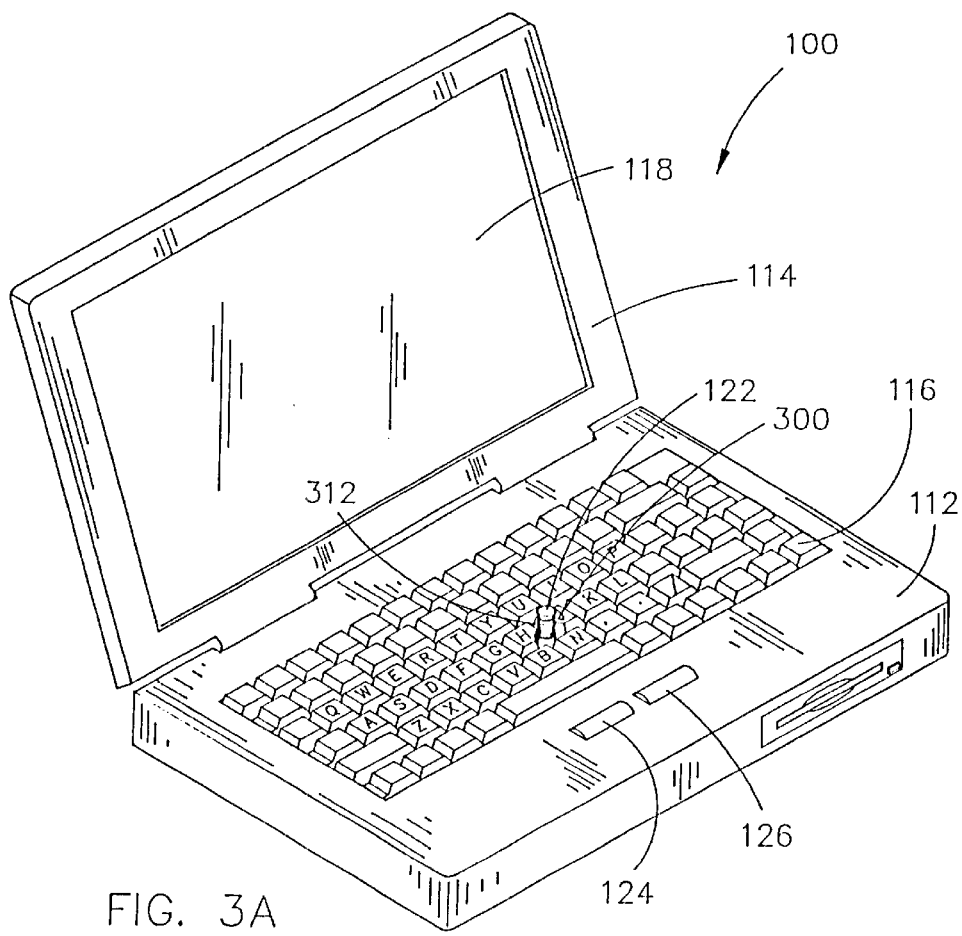
FIG. 3A is an isometric view of a portable computer having a telescoping joystick extension in accordance with a second embodiment of the present invention.
Figure 3B:
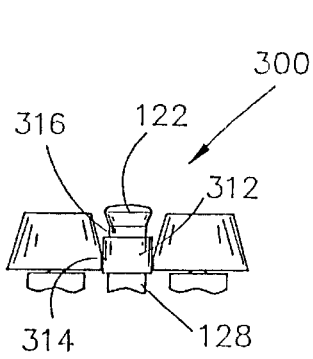
FIG. 3B is a side elevational view of the joystick extension shown in FIG. 3A, illustrated in the collapsed position.
Figure 3C:
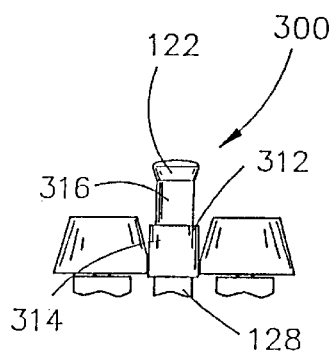
FIG. 3C is a side elevational view of the joystick extension shown in FIG. 3A, illustrated in the extended position.

Referring now to FIGS. 3A, 3B, 3C, 3D and 3F, joystick extensions 300 in accordance with a second exemplary embodiment of the invention are shown. Joystick extensions 300 are comprised of a telescoping extension member 312 having first and second segments 314 & 316. The second segment 316 may be slidably disposed within first segment 314 so that it may be extended and retracted between a collapsed position wherein the extension member 312 functions as a conventional cursor control stick (FIG. 3B), and an extended position wherein the telescoping extension member 312 is suitable for use as a joystick (FIG. 3C).

Figures 3D, 3E:
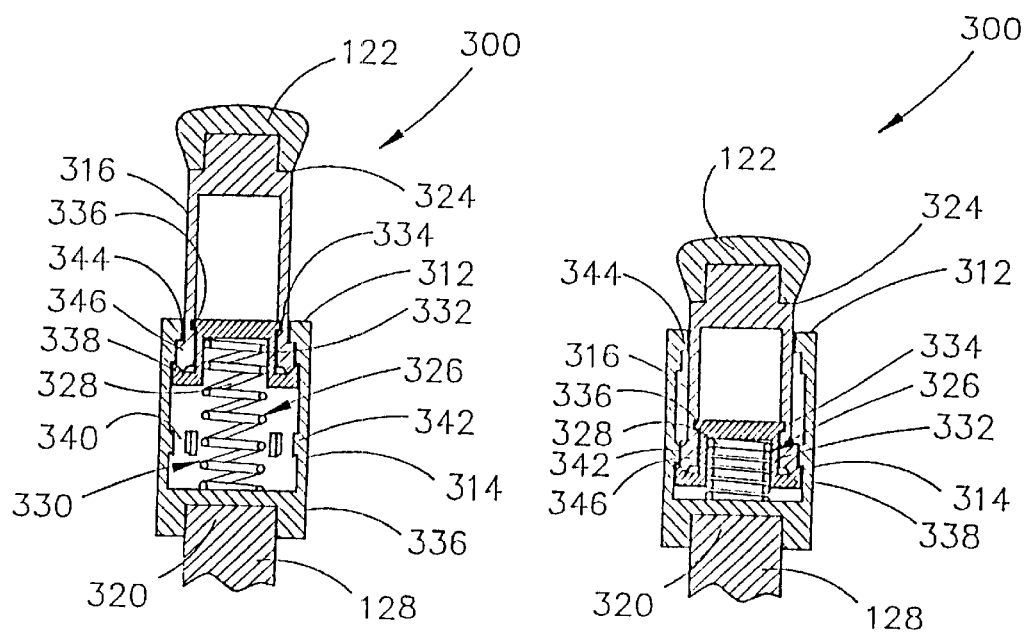
FIG. 3D is a cross-sectional side elevational view of the joystick extension shown in FIG. 3A, further illustrating an exemplary extension and retraction mechanism holding the joystick extension in the extended position.
FIG. 3E is a cross-sectional side elevational view of the joystick extension shown in FIG. 3A, further illustrating an exemplary extension and retraction mechanism holding the joystick extension in the collapsed position.
Figure 3F:
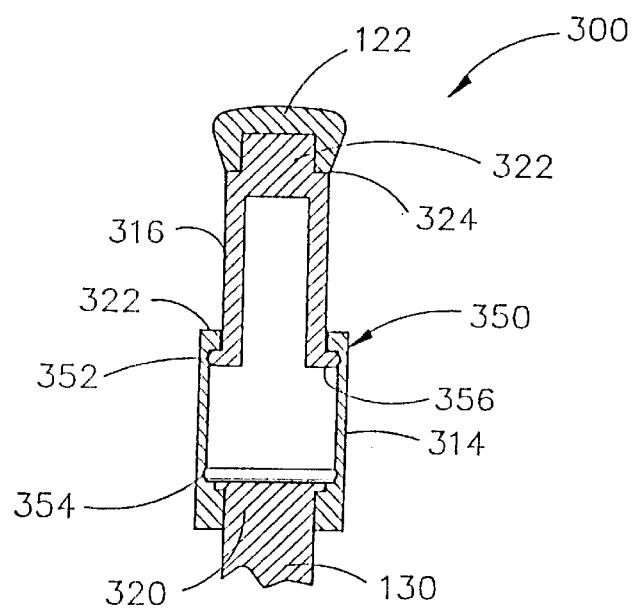
FIG. 3F is a cross-sectional side elevational view of the joystick extension shown in FIG. 3A, further illustrating an alternative extension and retraction mechanism.

First segment 314 is attached to the cursor control stick mounting post 128 via mounting post attachment portion 318 disposed at its lower end. As shown in FIGS. 3D and 3E, this attachment may be impermanent, allowing the telescoping extension member 312 to be removed and replaced by the cursor control stick cap 122. Like joystick extensions 200 shown in FIGS. 1A through 2C, mounting post attachment portion 318 includes an aperture 320 sized and shaped to fit securely onto the mounting post 128 of cursor control stick 120. Alternatively, as shown in FIG. 3F, mounting post attachment portion 318 may provide an attachment that is substantially permanent. For instance, as shown, a shaped mounting post 130 may engage aperture 320 so as to retain first segment 314. Similarly, first segment 314 could be adhered to mounting post 128 or the mounting post 128 and first segment 314 could be integrally molded as a single component.

A grip may be mounted to the upper end of the second segment 316 via grip attachment portion 322. In the preferred embodiment shown, the grip may be a conventional cursor control stick cap 122. As shown in FIG. 3D, the grip attachment portion 322 may include a neck 324 which is identical in size and shape to the mounting post 128 (e.g., polygonal, round, elliptical, etc.) of cursor control stick 120. The cursor control stick cap 122 would be placed onto the neck 324 and utilized as the grip of joystick extension 300. As discussed, supra, utilization of the cursor control stick cap 122 as the grip of the joystick extension 300 provides several advantages. For example, wherein the joystick extension 300 is removable, the grip attachment portion 322 provides a natural storage/usage position for the cursor control stick cap 122 while the joystick extension 300 is being utilized. Similarly, the cursor control stick cap 122, being made of a soft rubberized material, would minimize damage to the computer's display 118 should the joystick extension 300 be inadvertently left in the extended position when the lid portion 114 is closed.

A spring biased extension and retraction mechanism 326 may be provided for moving the second segment 316 between the collapsed position, shown in FIG. 3E, and the extended position, shown in FIG. 3D. Extension and retraction mechanism 326 comprises a helical compression spring 328 for providing a generally upward force (with respect to the processor portion 112 of computer 100) tending to move the second segment 316 to the extended position (FIGS. 3C and 3E). Extension and retraction mechanism further comprises a latching mechanism 330 for retaining the second segment 316 in the collapsed position against the upward force exerted by spring 328. The latching mechanism 330 allows the joystick extension 300 to be utilized as a conventional cursor control stick. Further, the latching mechanism 330 prevents the second segment 316 from contacting the display 118, typically a liquid crystal display (LCD), while the computer's lid portion 114 (FIG. 3A) is closed. Contact with the display 118 applies a concentrated force perpendicular to the LCD motherglass. This force could damage the display 118 (e.g., crack the LCD motherglass), and will degrade the display's operation over time.

In an exemplary embodiment, the extension and retraction mechanism 326 may function much like known extension and retraction mechanisms commonly utilized in retractable writing instruments (i.e., ball point pens) or magnetic latches. Latching mechanism 330 may be comprised of a latch member 332 coupled to the lower end of second segment 316. Preferably, latch member 332 includes a lip 334 that engages a groove 336 formed in the inner surface of second segment 316. Latch member 332 further includes one or more tabs 338 that engage channels 340 created by longitudinal guides 342 formed on the interior surface of first segment 314. Preferably, guides 342 are shaped so that the tab 338/channel 340 engagement causes latch member 332 to rotate as the second segment 316 is moved between the extended and collapsed positions. The lip 334/groove 336 connection allows latch member 332 to rotate within second segment 316 so that second segment 316 is not rotated against the user's fingertip.

First segment 314 may further include an inwardly disposed rim 344 formed at its upper end. Preferably, when second segment 316 is fully extended, rim 344 is engaged by a corresponding outwardly disposed rim 346 formed on the outer perimeter of the lower end of second segment 316. This prevents the second segment 316 from becoming detached from first segment 314 when second segment 316 is extended by spring 328.

In accordance with the exemplary embodiment shown in FIGS. 3D and 3E, telescoping extension member 312 is retracted to its collapsed position by pressing downward on its grip (e.g., cursor control stick cap 122). This action retracts second segment 316 and latch member 332 against the force of spring 328, and causes latch member 332 to be rotated by guides 342. As second segment 316 is moved slightly past the fully collapsed position, shown in FIG. 3E, tabs 338 are rotated beneath guides 342. When second segment 316 is released, spring 328 causes latch member 332 and second segment 316 to again move upward (i.e., toward the extended position) so that tabs 338 are trapped beneath guides 342 holding second segment 316 in the fully collapsed position.

Telescoping extension member 312 is extended in a similar manner by pressing downward on its grip (e.g., cursor control stick cap 122). This action rotates tabs 338 from beneath guides 342 and back into channels 340. When second segment 316 is released, tabs 338 slide upward in channels 340 allowing second segment 316 to be moved to the fully extended position by spring 328. Preferably, the stiffness of spring 328 is sufficient to fully extend second segment 316, but is insufficient to immediately damage display 118 should extension member 312 inadvertently be left in the extended position as lid portion 114 is closed (see FIG. 5).

Turning now to FIG. 3F, an alternative extension and retraction mechanism 350 is shown. In this embodiment, grooves 352 & 354 are formed in the inner surface of first segment 314 adjacent to its upper and lower ends. Second segment 316 includes a lip or tab 356 adjacent to its lower end. Preferably, lip 356 engages groove 352 to hold second segment 316 in the extended position. Similarly, lip 356 engages groove 354 to retain second segment 316 in the fully collapsed position. Second segment 316 is moved between the fully collapsed position and the fully extended position by grasping second segment 316 and either pushing downward or pulling upward with sufficient force to disengage lip 356 from grooves 352 & 354, respectively.

Figure 4A:
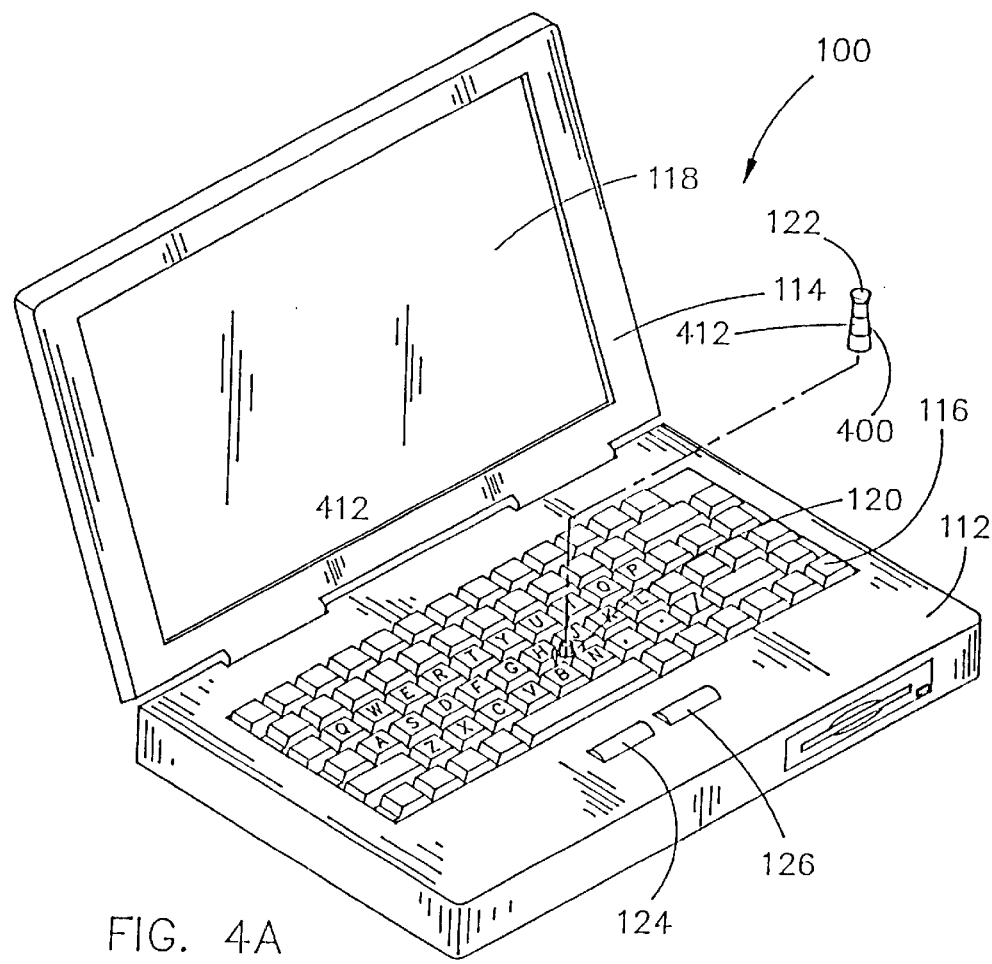
FIG. 4A is an isometric view of a portable computer having a telescoping joystick extension in accordance with a second embodiment of the present invention.
Figure 4B:
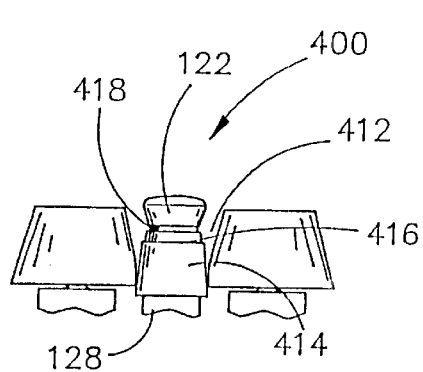
FIG. 4B is a side elevational view of the joystick extension shown in FIG. 4A, illustrated in the collapsed position.
Figure 4C:
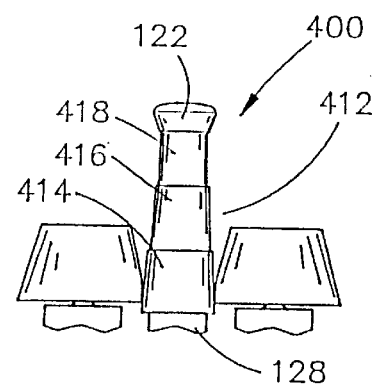
FIG. 4C is a side elevational view of the joystick extension shown in FIG. 4A, illustrated in the extended position.

Referring now to FIGS. 4A, 4B, 4C, 4D, and 4E, a joystick extension 400 in accordance with a third exemplary embodiment of the invention is shown. The joystick extension 400 is comprised of a telescoping extension member 412 having multiple segments (three segments 414, 416 & 418 are shown) that can retract into and extend out of each other. In this manner, the joystick extension 400 may be extended to provide a joystick suitable for use as a game controller or more easily manipulated cursor control device (FIG. 4C), and retracted to provide a conventional cursor control stick (FIG. 4B). Preferably, extension member segments 414, 416 & 418 are slightly tapered so that when extended, friction between the segments 414, 416 & 418 holds them in the extended position. Alternately, a locking apparatus (not shown), such as the spring-loaded locking mechanism illustrated in FIG. 3D may be utilized to extend one or more of the segments 414, 416 & 418. Alternatively, extension member 412 may utilize no locking method whatsoever, relying on continuous upward pressure by the user's hand to remain extended.

Figure 4D:
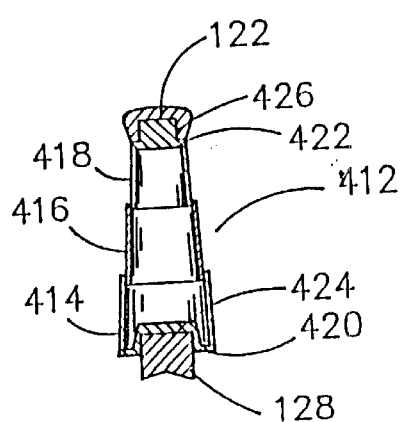
FIG. 4D is a cross-sectional side elevational view of the joystick extension shown in FIG. 4A, illustrated in the extended position.

The base or first segment 414 of telescoping extension member 412 includes a mounting post attachment portion 420 for providing attachment of the telescoping extension member 412 to the mounting post 128 of cursor control stick 120. As shown in FIG. 4D, this attachment may be impermanent, allowing the telescoping extension member 412 to be removed by the user and replaced by the cursor control stick cap 122. Like joystick extensions 200 & 300 shown in FIGS. 1A through 3D, mounting post attachment portion 420 preferably includes an aperture 420 sized and shaped to fit securely onto the mounting post 128 (e.g., having a polygonal, circular, oval, etc. shape).

Figure 4E:
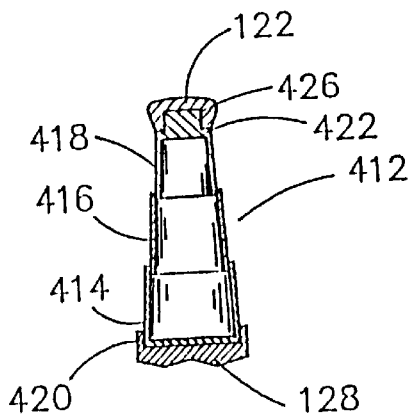
FIG. 4E is a cross-sectional side elevational view of an alternative embodiment of the joystick extension shown in FIG. 4A wherein the extension member is permanently attached to the mounting post.

Alternatively, the attachment may be more permanently mounted to the portable computer 100. For example, as shown in FIG. 4E, the mounting post attachment portion 420 could be attached to mounting post 128 via an adhesive or fasteners, or, the mounting post 128 and the first segment 414 could be integrally molded as a single component.

A top or second segment 418 of the telescoping extension member 412 may include a grip attachment portion 422 for attachment of a grip. In a preferred embodiment shown in FIGS. 4A through 4E, the grip attachment portion 422 includes a neck 424 substantially identical in size and shape to mounting post 128. In this manner, cursor control stick cap 122 may be utilized as the grip to provide a textured gripping surface at the upper end of the joystick extension 400. Further, wherein the joystick extension 400 is removable (FIG. 4D), the grip attachment portion 422 provides a natural storage/usage position for the cursor control stick cap 122.

Alternatively, a grip (not shown) other than the cursor control cap 122 may be provided for the joystick extension 400. Such a grip may have any of numerous shapes and sizes depending on the requirements of the manufacturer and user. Further, it should be recognized that the grip may be integrally formed or permanently attached to the grip attachment portion 422 of the second segment 418.

The telescoping extension member 412 may include one or more intermediate segments 416 slidably disposed between the first and second segments 414 & 418. Each segment 414, 416 & 418 may alternatively be smaller or larger in cross-section than the segment 414, 416 & 418 into or onto which it collapses. Thus, the extension member 412 may be telescoped with the largest segment at either the bottom (shown) or the top (not shown) depending on how the joystick extension 400 can best be implemented on the particular portable computer 100. Further, although three segments 414, 416 & 418 are shown in FIGS. 4A, 4B, 4C, 4D and 4E, it should be appreciated that the extension member 412 can include any number of segments.

The joystick extension 400 is extended by grasping the grip of telescoping extension member 400 (e.g., cap 122) and pulling upward to expose one or more of the extension member segments 414, 416 & 418. Preferably, not all of the extension member segments 414, 416 & 418 need be fully extended. Thus, the telescoping extension member 412 naturally allows for adjustment of joystick height by the user. The joystick extension 400 is collapsed by pressing downward on the grip (e.g., cap 122), thereby retracting each extended segment 414, 416 & 418 of telescoping extension member 412.

Preferably, wherein the cursor control stick cap 122 is utilized as the joystick grip, greater force is required to remove the cap 122 than is required to extend the telescoping extension member 412. Thus, a user may remove the cursor control stick cap 122 from the joystick extension 400 by first gripping the cap 122 and pulling it upwards so that telescoping extension member 412 is extended. The user may then apply an upward force on the cursor control stick cap 122 until it separates from neck 424. Wherein the telescoping extension member 412 is removable from the mounting post 128, the user may need to hold the extension member 412 in place as the cap 122 is removed.

Figure 5:
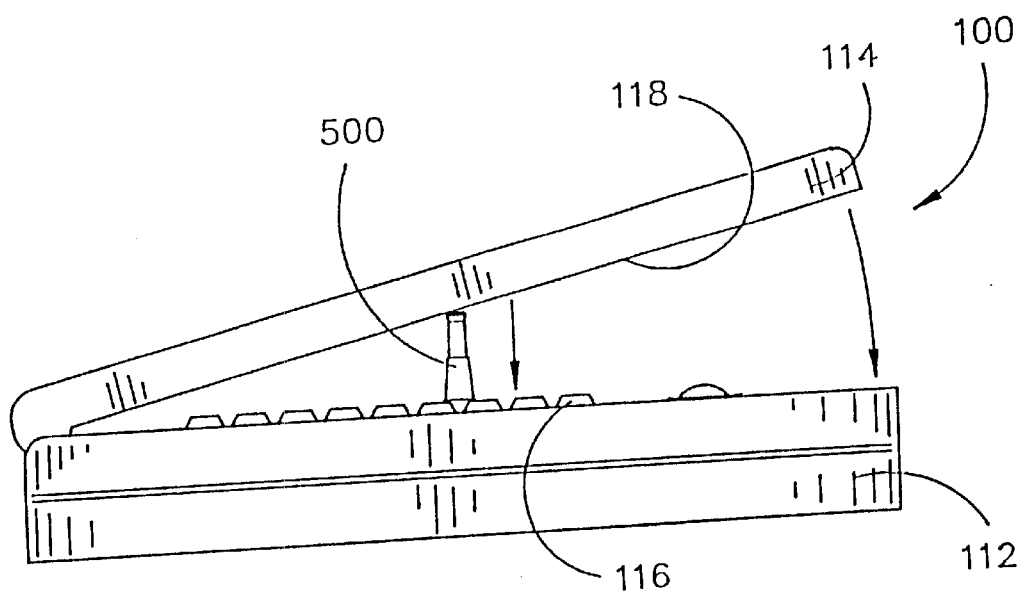
FIG. 5 is a side elevational view of the portable computer illustrating retraction of the telescoping extension members of the present invention as the lid of the computer is folded against the keyboard.

Turning now to FIG. 5, a portable computer 100 employing a telescoping joystick extension 500 such as joystick extensions 300 & 400 shown in FIGS. 3A through 4E is illustrated. The joystick extension 500 may be collapsed via contact with the lid portion 114 of portable computer 100. Thus, wherein the computer user neglects to retract the joystick extension 500 before closing the lid portion 114, the joystick extension's telescoping design will prevent damage the display 118 because the surface of the display 118 will contact the soft grip (e.g., cursor control cap 122) and collapse the joystick extension 500 into its retracted position.

It is believed that the joystick extension apparatus of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A joystick extension for a cursor control stick, comprising:
    at least one extension member having a first end and a second end;
    said first end including a mounting post attachment portion; and
    said second end providing a grip;
    wherein said mounting post attachment portion is suitable for attaching said extension member to the mounting post of said cursor control stick so that said cursor control stick may be utilized as a joystick.

2. The joystick extension as recited in claim 1, wherein said mounting post attachment portion comprises a surface having an aperture formed therein, said aperture sized and shaped to fit securely onto the mounting post of said cursor control stick.

3. The joystick extension as recited in claim 1, wherein said mounting post attachment portion is permanently attached to said mounting post.

4. The joystick extension as recited in claim 1, wherein said second end includes a grip attachment portion comprising a neck having the same size and shape as the mounting post of said cursor control stick for attachment of said grip.

5. The joystick extension as recited in claim 4, wherein the cap of said cursor control stick is removed from said cursor control stick mounting post when said extension member is installed thereon and utilized as said grip.

6. The joystick extension as recited in claim 1, wherein at least two of said extension members are stacked on top of each other so that a first extension member is attached to the mounting post of said cursor control stick and a second extension member receives said grip.

7. The joystick extension as recited in claim 1, wherein said extension member comprises one or more telescoping segments configured to fit and slide within one another.

8. The joystick extension as recited in claim 7, wherein said extension member further comprises a spring biased extension and retraction mechanism for extending and retracting said telescoping segment between a collapsed position and an extended position.

9. The joystick extension as recited in claim 7, wherein said extension and retraction mechanism includes a latching device for holding the extension member in the collapsed position.

10. The joystick extension as recited in claim 1, wherein said extension member is made at least one of a rigid plastic and a metal.

11. The joystick extension as recited in claim 1, wherein said extension member has a textured surface.

12. The joystick extension as recited in claim 1, wherein said extension member is at least partially coated with a rubberized material.

13. A joystick extension for a cursor control stick, comprising:
    at least one extension member having a first end and a second end;
    a mounting post attachment portion disposed in the first end of said extension member; and
    a grip attachment portion disposed in the second end of said extension member;
    wherein said mounting post attachment portion is suitable for attachment to one of the mounting post of said cursor control stick and a grip attachment portion of a second extension member and said grip attachment portion is suitable for attachment of one of a grip and a second extension member so as to provide a joystick.

14. The joystick extension as recited in claim 13, wherein said mounting post attachment portion comprises a surface having an aperture formed therein, said aperture sized and shaped to fit securely onto one of the mounting post of said cursor control stick and the grip attachment portion of a second extension member.

15. The joystick extension as recited in claim 13, wherein said grip attachment portion comprises a neck having substantially the same size and shape as the mounting post of the cursor control stick.

16. The joystick extension as recited in claim 15, wherein a cursor control stick cap is removed from said cursor control stick mounting post when said extension member is installed thereon.

17. The joystick extension as recited in claim 13, wherein said extension members are stacked on top of each other so that a first extension member is attached to the mounting post and a second extension member receives the cursor control stick cap.

18. The joystick extension as recited in claim 13, wherein said extension member is made at least one of a rigid plastic and a metal.

19. The joystick extension as recited in claim 13, wherein said extension member has a textured surface.

20. The joystick extension as recited in claim 13, wherein said extension member is at least partially coated with a rubberized material.

21. A joystick extension for a cursor control stick, comprising:
    telescoping extension member having a first end and a second end;

mounting post attachment portion disposed in the first end of said telescoping extension member, said mounting post attachment portion suitable for attaching said telescoping extension member to the mounting post of said cursor control stick; and a grip attachment portion disposed in the second end of said telescoping extension member, said grip attachment portion suitable for attachment of a cursor control stick cap;

wherein said telescoping extension member may be alternately extended to provide a joystick controller device and retracted to provide a cursor control stick.

22. The joystick extension as recited in claim 21, wherein said telescoping extension member comprises a plurality of segments configured to fit and slide within one another.

23. The joystick extension as recited in claim 21, wherein the outermost of said telescoping extension member includes said mounting post attachment portion and the smallest of said plurality of segments includes said grip attachment portion.

24. The joystick extension as recited in claim 21, wherein the innermost of said telescoping extension member includes said mounting post attachment portion and the outermost of said plurality of segments includes said grip attachment portion.

25. The joystick extension as recited in claim 21, wherein at least one end of said telescoping extension member is tapered for locking said telescoping extension member in the extended position.

26. A computer, comprising:

a keyboard;

a telescoping extension member positioned on said keyboard, said telescoping extension member having a first end and a second end;

a mounting post attachment portion disposed in the first end of said telescoping extension member, said mounting post attachment portion suitable for attaching said telescoping extension member to the mounting post of a cursor control stick; and a grip attachment portion disposed in the second end of said telescoping extension member, said grip attachment portion suitable for attachment of a cursor control stick cap;

wherein said telescoping extension member may be alternately extended to provide a joystick and retracted to provide a cursor control stick.

27. The computer as recited in claim 26, wherein said telescoping extension member comprises a plurality of segments configured to fit and slide within one another.

28. The computer as recited in claim 27, wherein the outermost of said plurality of segments includes said mounting post attachment portion and the smallest of said plurality of segments includes said grip attachment portion.

29. The computer as recited in claim 27, wherein the innermost of said plurality of segments includes said mounting post attachment portion and the outermost of said plurality of segments includes said grip attachment portion.

30. The computer as recited in claim 27, wherein at least one of said segments is tapered for locking said telescoping extension member in the extended position.

31. The computer as recited in claim 26, further comprising a portable housing including a main housing portion on which said keyboard is disposed and a lid portion having a display, said main housing portion and lid housing portion pivotally attached together so that said main housing portion and said lid portion may be folded together.

32. The computer as recited in claim 31, wherein folding of said housing and said lid together causes said telescoping extension member to retract to prevent damage to said display.

33. The computer as recited in claim 31, wherein said extension member further comprises a spring biased extension and retraction mechanism for extending and retracting at least one of said telescoping segments between a collapsed position and an extended position.

34. The computer as recited in claim 33, wherein said extension and retraction mechanism includes a latching device for holding said telescoping segment in the collapsed position.

* * * * *